(No Model.) 7 Sheets—Sheet 1.
H. H. CUMMINGS, W. E. BENNETT & R. THOMPSON.
SEWING MACHINE.

No. 343,949. Patented June 15, 1886.

WITNESSES:

INVENTORS

(No Model.) 7 Sheets—Sheet 2.
H. H. CUMMINGS, W. E. BENNETT & R. THOMPSON.
SEWING MACHINE.

No. 343,949. Patented June 15, 1886.

WITNESSES:

INVENTORS (No Model.) 7 Sheets—Sheet 4.
H. H. CUMMINGS, W. E. BENNETT & R. THOMPSON.
SEWING MACHINE.
No. 343,949. Patented June 15, 1886.

WITNESSES:

INVENTORS

(No Model.) 7 Sheets—Sheet 5.
H. H. CUMMINGS, W. E. BENNETT & R. THOMPSON.
SEWING MACHINE.
No. 343,949. Patented June 15, 1886.

(No Model.) 7 Sheets—Sheet 6.
H. H. CUMMINGS, W. E. BENNETT & R. THOMPSON.
SEWING MACHINE.

No. 343,949. Patented June 15, 1886.

WITNESSES: INVENTORS (No Model.) 7 Sheets—Sheet 7.
H. H. CUMMINGS, W. E. BENNETT & R. THOMPSON.
SEWING MACHINE.

No. 343,949. Patented June 15, 1886.

WITNESSES  
INVENTORS  
Henry H Cummings  
Walter E Bennett  
Roswell Thompson  
By Henry A Chapin  
ATTORNEY

UNITED STATES PATENT OFFICE.

HENRY H. CUMMINGS, OF MALDEN, AND WALTER E. BENNETT AND ROSE-WELL THOMPSON, OF BOSTON, ASSIGNORS TO THE MORLEY SEWING MACHINE COMPANY, OF BOSTON, MASSACHUSETTS.

SEWING-MACHINE.

SPECIFICATION forming part of Letters Patent No. 343,949 dated June 15, 1886.

Application filed December 19, 1885. Serial No. 186,125. (No model.)

*To all whom it may concern:*

Be it known that we, HENRY H. CUMMINGS, WALTER E. BENNETT, and ROSEWELL THOMPSON, citizens of the United States, and residing in the State of Massachusetts, said CUMMINGS at Malden, county of Middlesex, said BENNETT at Boston, county of Suffolk, and said THOMPSON at Boston, county of Suffolk, have jointly invented new and useful Improvements in Sewing-Machines, of which the following is a specification.

This invention relates to improvements in sewing-machines, the object being to provide improved stitching mechanism adapted to cooperate with a needle which is not threaded, but has an opening in its side through which the thread enters the eye, to provide improved take-up and feed mechanism for said machine, and improved shuttle attachments, whereby the thread therefrom is made to engage with said needle.

In the drawings forming part of this specification.

Like letters and numerals indicate similar parts in the several figures.

Figures 3, 4:
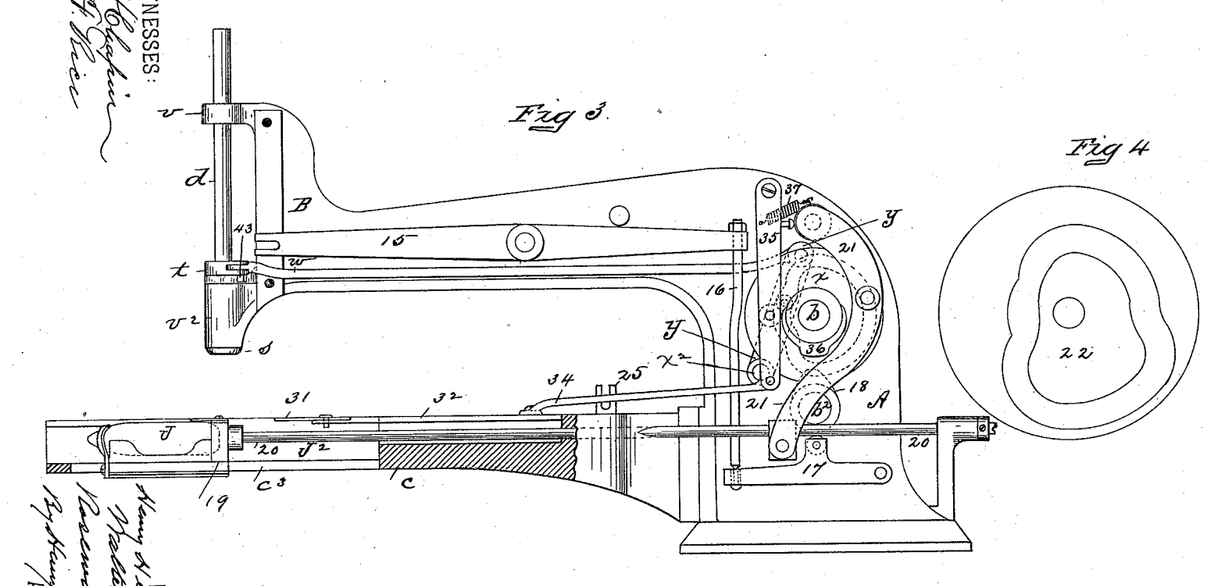
Fig. 3 is an elevation of the side of the machine shown in Fig. 1, with the shuttle-cam, the take-up slide-lever, the presser-foot, and the feeding devices removed, and showing the horn of the machine partly in section.
Fig. 4 is a plan view of the inner side of the shuttle-cam.

In the drawings, A is the frame of the machine. B is the arm. $b$ $b^2$ are respectively the main and the secondary shafts, running by any suitable power in suitable bearings in the frame or in standard-supports thereon; and $c$ is the horn, the latter having the shuttle-race $J^2$ between its vertical sides, and in the edge of one of the latter the groove $c^2$, for a purpose hereinafter described; and, furthermore, on one side of the shuttle-race $J^2$ (see Figs. 5, 13, 14, and 15) is formed the needle-groove $a$, in which the needle $i$ has its vertical movement, and whereby it is prevented from projecting so far beyond the side of the race as to interfere with the movement of the shuttle, and is brought into proper operative relation with the loop-hook $m$, which is fixed in the side of the shuttle-race, near the side of groove $a$. Said loop-hook (shown in end view and perspective in Fig. 18) is secured in the side of the race $J^2$ by its stem 40, its front end being in the form of a segment of a circle, its edges from the center of stem 40 extending at right angles to each other and having the groove 38 therein, and the point 39, formed by the junction of its grooved edges, constitutes the hook proper of the device, with which the thread engages, as hereinafter described. The loop-hook is so set in the side of the shuttle-race that its outer face is in a plane with the latter, and one of its said grooved edges is open at the side of groove $a$, and the other is parallel with the bottom of the shuttle-race. A slot, $c^3$, is formed in the bottom of the shuttle-race, to receive a portion of the shuttle-carriage 19, as shown in Fig. 3. A depression, 52, is formed in the side of the shuttle-race by the side of the groove $a$, into which the end of a thread-guide on the shuttle is carried, as below described. The cloth-plate $e$ is secured on the horn $c$, over said groove $a$ and loop-hook $m$, as shown, and has a slot therein, through which the needle passes. The presser-bar $h'$, carrying the presser-foot $h$ is hung on the side of the arm B, as shown, and is given the usual properly-timed vertical motions by the lever 15, which is pivoted on said arm, and is operated by the cam 18, (see Fig. 3,) which acts on the lever 17, the latter being connected to lever 15 by the rod 16. The presser-bar spring $h^2$ is attached to arm B, and bears on a pin in the side of the presser-bar.

The needle-bar $d$ is supported in the bearings $v\ v^2$ on arm B, a sleeve, $s$, through which the needle-bar passes, being placed in the said bearing $v^2$, having a flange on its lower end, as shown, and having the crank-collar $t$ secured on its opposite end. The needle-bar has the spline groove $s^3$ in that part of it which operates within said sleeve $s$, and within the latter is secured in any suitable manner the feather or key $s^2$, which fits in said needle-bar groove $s^3$. The key or feather $s^2$ enters a slot or groove in sleeve $s$, so that the rocking of this sleeve will also rock the needle-bar on its axis.

Figures 5, 6:
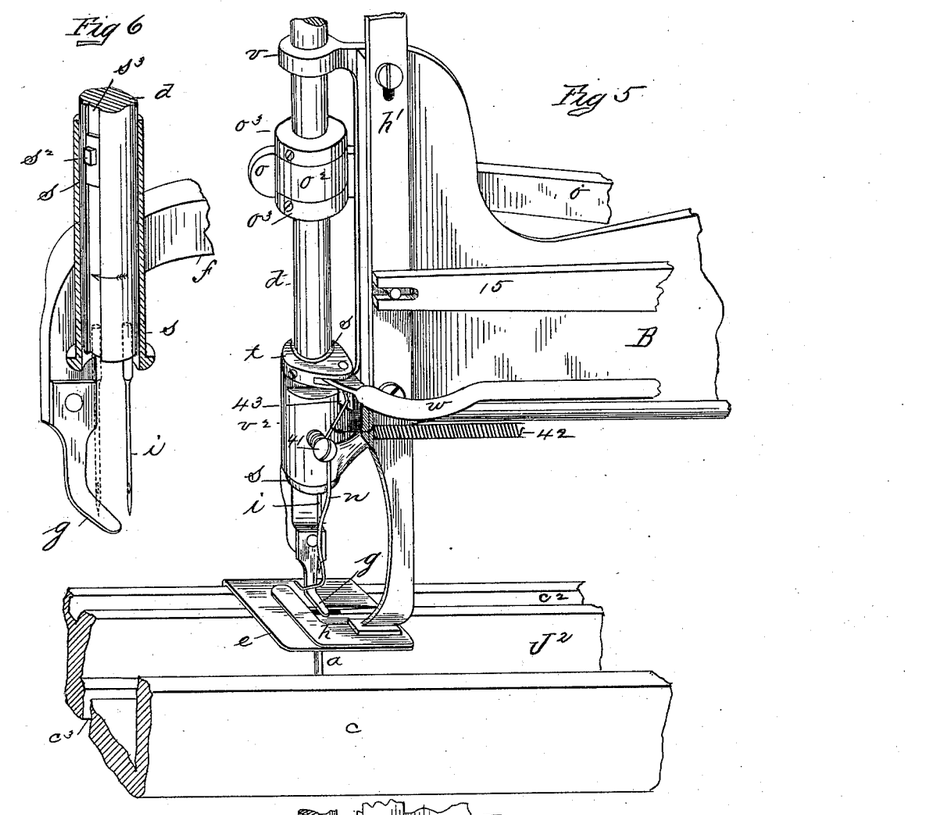
Fig. 5 is an enlarged perspective view of the front end of the machine above the horn from the side shown in Fig. 2, the upper ends of the needle-bar and the presser-bar being broken off, a portion of the horn and the cloth-plate thereon being shown.
Fig. 6 is an enlarged perspective view of the lower end of the needle-bar, showing the position of the needle in its lower end, its grooved sleeve in longitudinal section, and the lower end of the feed-arm and its tongue, and in dotted lines the changed position of the needle when the needle-bar rotates.

The needle $i$ is set in the lower end of the needle-bar, to one side of the axis of the latter, as clearly shown in Fig. 6 and others of the drawings, and in said figure is shown in dotted and full lines the two positions each side of the axis of the needle-bar, and each side of the feed-tongue $g$, which the needle is made to take while making the stitch, as hereinafter described.

The usual vertical reciprocating motions of the needle-bar are imparted to it by the lever $o$, which is pivoted on the side of the arm B, the rear end of said lever engaging with a suitable groove in the inner face of the cam-wheel $w^2$ on shaft $b$. The connection of the front end of lever $o$ with the needle-bar is made by means of the sleeve $o^2$, which has a ball-and-socket connection with the lever, and is held in position between the collars $o^3\ o^3$ on the needle-bar, whereby it is permitted to have the requisite slight reciprocating rotary motion thereon during the vibratory motion of the needle-bar.

The construction of the needle-bar $d$, the attachment thereto of the needle to one side of the axis of the latter, and mechanism, as hereinafter described, for imparting a reciprocating rotary motion to the needle-bar in addition to its reciprocating vertical motions, always in the same plane, is provided, to the end that stitches, each consisting of several threads passing over and under the fabric between two points thereon, may be formed of a given length without moving the material while the stitch is being made, which length is determined by the distance from the axis of the needle-bar at which the needle is set, the length of the stitch thus made being twice that of said distance. The said reciprocating rotary motion is given to the needle-bar $d$ by the cam $x$ (see Fig. 3) on shaft $b$, which acts on the lever $y$, pivoted at $x^2$, the free end of the latter being connected with the crank-collar $t$ on sleeve $s$ by the rod $w$. The rocking of the needle-bar on its axis swings the needle through the arc of a circle, but the movement is not so great but that the eye in the side of the needle opens in the same general direction during the movement.

Figures 10, 11:
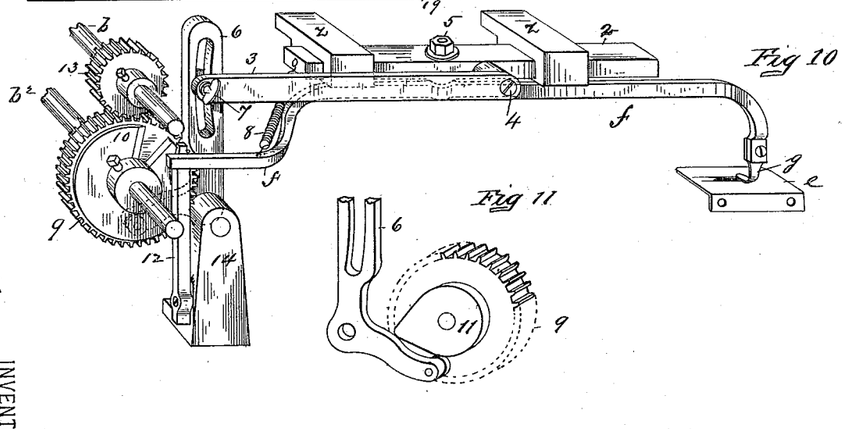
Fig. 10 is a perspective view of the cloth-plate, the feeding devices, and their operating mechanism.
Figs. 11 and 12 are detail views of the parts shown in Fig. 10, and are hereinafter fully explained.
Figure 12:
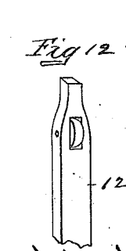

The feeding of the fabric along over the cloth-plate in this machine, in order to bring the above-mentioned stitches at proper distances apart, or, in other words, to space them, is effected by the engagement of a feed-tongue with the stitch, the latter being formed over the said tongue, which occupies a position above the fabric and has a longitudinal and laterally-reciprocating motion. The formation of the stitch over said tongue serves to leave a certain fullness to the stitch when completed, which obviates too much tightness of the latter in the fabric. Said feed-tongue $g$ is supported in a position parallel with the upper side of the cloth-plate $e$, and its position when the stitch is being formed over it is about midway between the ends of the slot in the cloth-plate, as shown in Fig. 5. The tongue $g$ is attached to the end of the feed-arm $f$, the latter extending from over the cloth-plate rearwardly to the side of a pivoted lever, 12, (see Figs. 1 and 10,) said arm $f$ being pivoted by a bolt, 5, to the under side of a sliding bar, 2, hung in the supports $z\ z$ under the arm B. Said sliding bar 2 is connected with the slotted elbow-lever 6 by the rod 3, the latter being pivoted to said bar 2 at 4, and having the thumb-screw 7 in its end, whereby the latter is moved to different positions on lever 6 to vary the feed-motion of the tongue $g$. Said elbow-lever is pivoted on the standard 14, and its lower arm extends under a cam, 11, Fig. 11, back of the gear-wheel 9, whereby said lever is given a vibratory motion. A spring, $f'$, connected to bolt 5 on sliding bar 2, and to the end of arm B, serves to draw said bar toward the latter. The aforesaid pivoted lever 12, whose upper end is back of the feed-arm $f$, has a lateral vibratory motion imparted to it by its contact with the face-cam 10 on shaft $b^2$. A spring, 8, connects the end of arm $f$ with the rear end of the bar 2. Thus by the action of said elbow-lever 6 and spring $f'$, whereby a longitudinal reciprocating motion is given to the bar 2, a like motion is given to the feed arm and tongue $g$, and by the action of the lever 12 and spring 8 a laterally-vibratory motion is also given to the feed arm and tongue, which motions are so timed that the tongue $g$ rests, as above described, over the fabric while the stitch is being formed over it, and it then moves in the direction of the length of the horn $c$, drawing the fabric with it by its engagement with the stitch the requisite distance to space the stitches. The tongue then swings laterally from under the said stitch, moves back again over the fabric to the point from which it started, and swings inward to again have a stitch formed over it.

Figure 2:
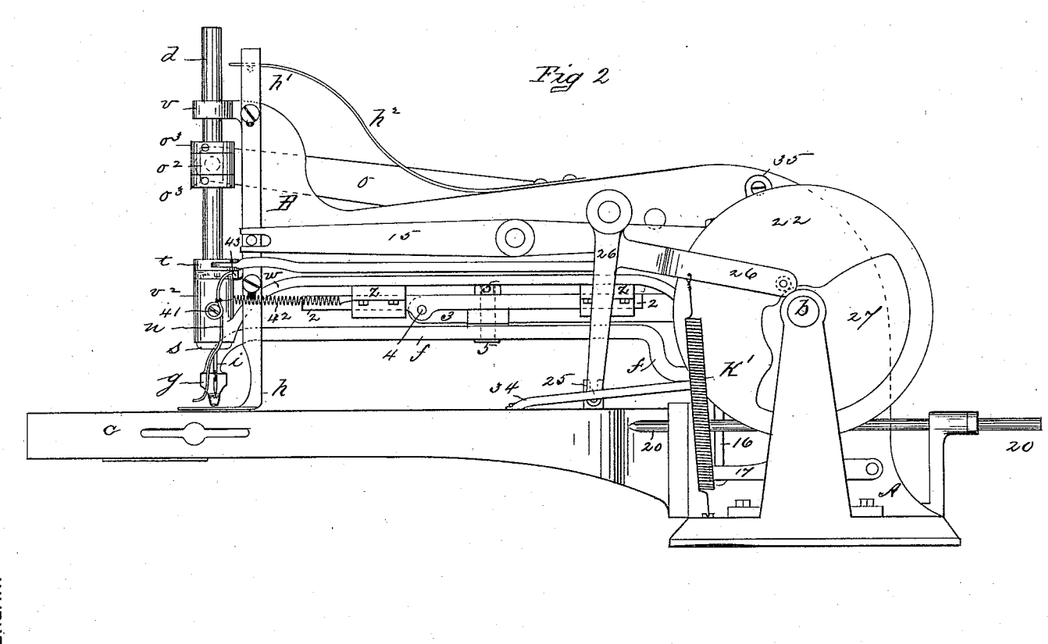
Fig. 2 is an elevation of the side of the machine opposite to that shown in Fig. 1.
Figures 8, 9:
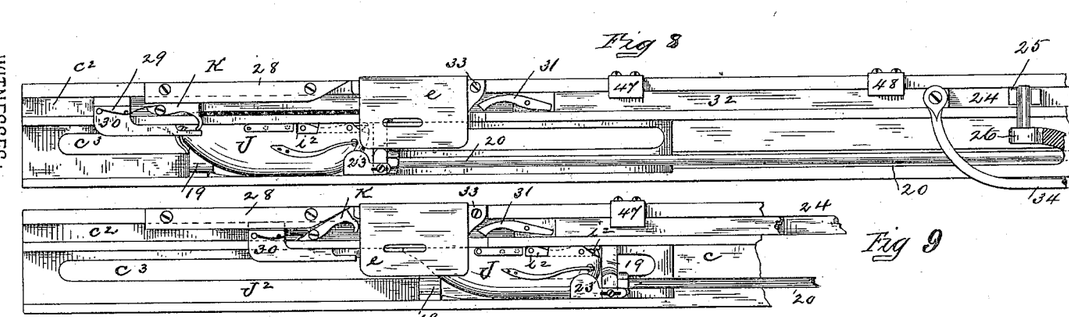
Fig. 8 is a plan view of the horn of the machine, showing the shuttle in its most advanced position.
Fig. 9 is a similar view to the latter, but showing the shuttle in its rearward position.

The take-up devices of this machine consist of a horizontally-vibrating take-up hook, K, which is pivoted on a slide-bar, 24, which lies in the groove $c^2$ in the horn $c$, properly-timed reciprocating motion being given to said bar 24 by the elbow-lever 26, Fig. 2, which is pivoted on the side of arm B, one of whose arms engages in a slotted post, 25, on said bar, and the other having a bearing on a cam, 27, a spring, K', serving to hold the end of said arm against said cam. A plate, 30, attached to the bar 24, and having an end reaching before the hook K, serves as a stop for the end of the hook, the latter swinging against the edge of said plate after it has engaged the thread, as in Fig. 15, and the latter becomes so engaged thereby by the hook K that the latter cannot let the thread go until actuated by a further movement of the parts of the machine. A spring, 29, serves to swing the point of hook K away from the plate 30. A guide-plate, 28, to govern the motions of the take-up hook K, is fixed on the horn $c$, Figs. 8 and 9. Fig. 9 illustrates the position of the hook K when allowed to swing back by being brought opposite the inclined end of the said plate 28, ready to swing inward and hook onto the thread, and Fig. 8 illustrates the position of the hook K after having engaged with the thread and moved toward the end of the horn opposite the straight edge of plate 28, whereby the hook is swung against the edge of the latter.

Figures 15, 18:
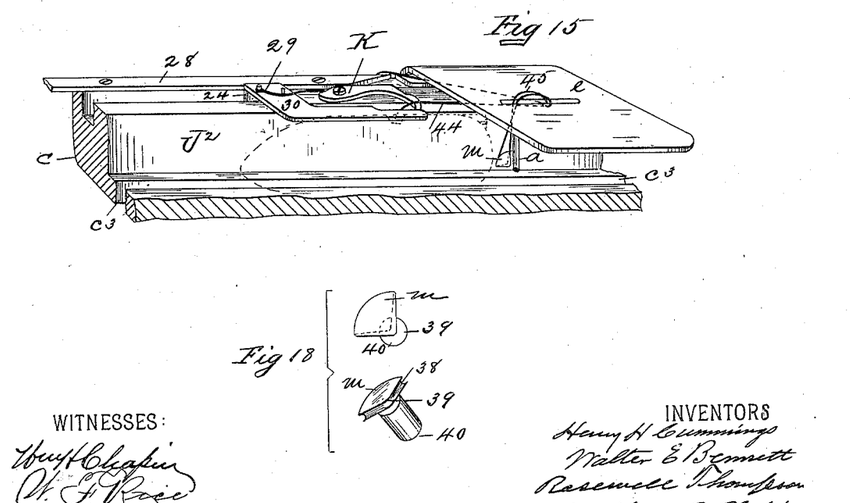
Fig. 15 is a perspective view of the cloth-plate and the take-up mechanism, showing a portion of the horn in section and the position of the shuttle, (in dotted lines,) the thread and the take-up after the shuttle has moved past the needle and through the loop from the position shown in Fig. 14.
Fig. 18 is a plan and a perspective view of the stationary loop-hook.
Figure 16:
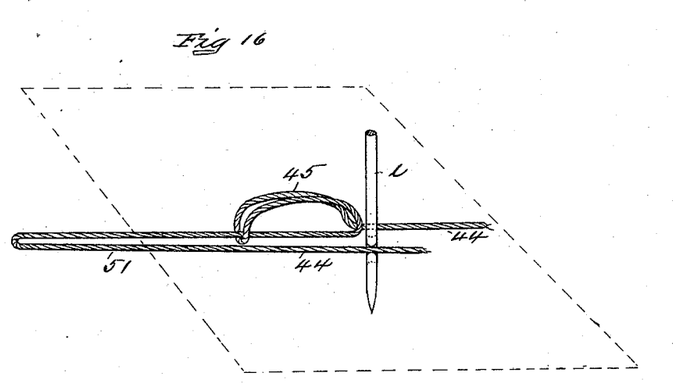
Fig. 16 is a perspective view, enlarged, of the part of the stitch shown in Fig. 15, after the take-up mechanism has drawn up the loop and the shuttle has retired, giving off the thread for the remainder of the stitch, the needle being shown in position to re-engage with the thread, the outlines of the fabric being shown in dotted lines.

Fig. 15 illustrates the position of the above-described take-up parts at the beginning of the movement of the hook K after it has engaged the thread, the hook moving toward the end of the horn and drawing the thread it seized in the form shown at 51, Fig. 16, and then moving back toward the cloth-plate $e$ and releasing the thread. The hook becomes engaged with the thread when the shuttle J (shown in dotted lines in Fig. 15) moves past the cloth plate to about the position indicated in said figure.

The shuttle J is of the ordinary description used in sewing-machines, and carrying all of the thread employed in making the stitch on a bobbin within it; but to adapt the shuttle to operate properly with the needle $i$, having an opening through the side of its eye and moving in the groove $a$ in the side of the shuttle-race, the vibratory thread-guide $i^2$ is pivoted under the upper side of the shuttle, near its rear end, through a hole in which guide the thread makes its exit as it leaves the latter. The edge of the shell of the shuttle is cut away to allow the perforated end of said thread-guide to come to the surface, and the opposite end of said guide extends back of the pivot-point thereof, and is shown through a cut in the shuttle-case in Fig. 9. When the needle is to take the thread to draw a loop up through the cloth-plate, the end of the said thread-guide through which the thread passes is brought opposite to the depression 52 in the side of the shuttle-race. At this instant the slide 32, having the pivoted finger 31 thereon, moves toward the cloth-plate, driving the end of said finger against the edge of the cam-plate 33 on the edge of the horn, and carrying said finger against the rear end of the thread-guide $i^2$, swinging its forward end into said depression 52 in the wall of the shuttle-race, and carrying the thread against the side of the needle and insuring the engagement of the latter with the thread when it rises. After the needle catches the thread said finger retires to act again when the position of the shuttle requires it. The slide 32, which carries the said finger 31, is located in groove $c^2$ in the horn $c$ over the slide 24, and said slides are held in position in said groove by the side clips, 47 and 48, which are secured to the horn and extend over said groove and slides. Said slide 32 has its reciprocating motions given to it by the swinging lever 35, Fig. 3, actuated by the cam 36, a spring, 37, drawing said lever against said cam. Rod 34 connects the lever 35 with the slide 32. A latch, 23, is secured adjustably on the shuttle-carriage, (see Figs. 8 and 9,) whereby the shuttle J is secured in the carriage 19.

The reciprocating motion of the shuttle-carriage is imparted to it by the swinging lever 21, actuated by the cam 22, Figs. 3 and 4, a groove in the latter engaging with a stud on said lever, and the lower end of the latter being connected to the rod 20, to the forward end of which the shuttle-carriage is attached.

Figure 7:
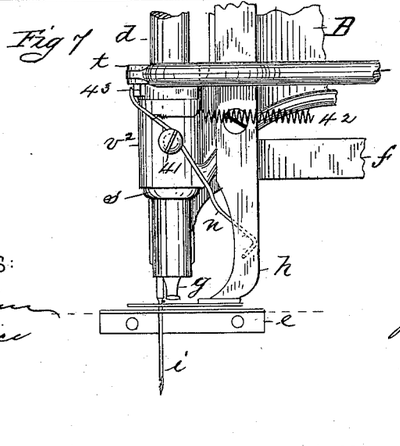
Fig. 7 is a side view of a portion of the end of the arm of the machine, the presser-foot, and cloth-plate, the lower end of the needle-bar having the needle therein, the needle-bar-rotating sleeve and its operating connecting-rod, the loop-retainer, and the end of the feed bar and tongue.
Figure 13:
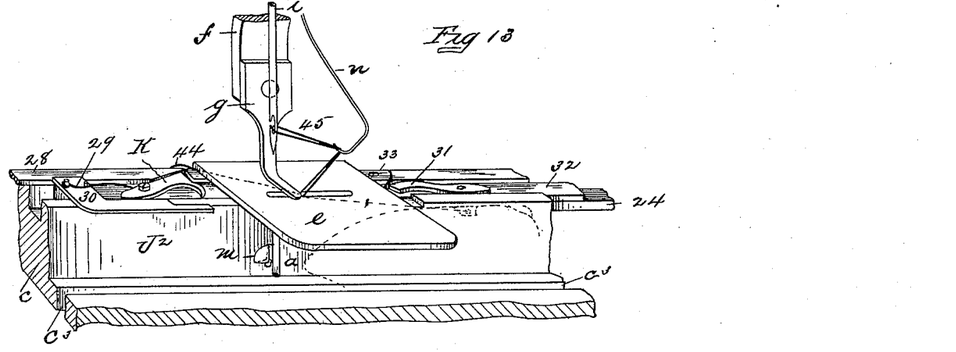
Fig. 13 is a perspective view of detail parts, hereinafter referred to, illustrating the position of said parts at the commencement of making the stitch.
Figure 14:
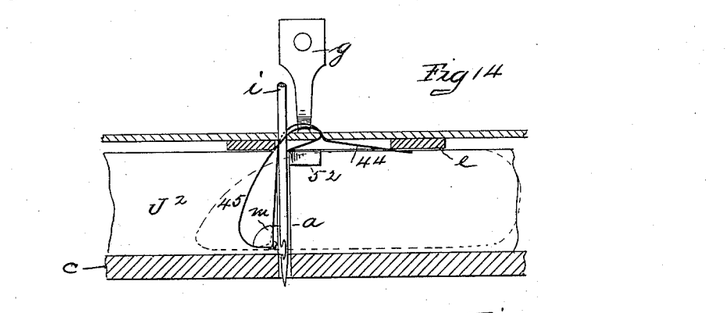
Fig. 14 is a sectional elevation through the cloth-plate and horn, on a line with the slot in the cloth-plate, showing the shuttle (in dotted lines) engaged with the thread-loop, as in the second step of making the stitch.

A flexible loop-retainer, $n$, formed from suitable spring-wire, is pivoted at 41 on the side of the needle-bar bearing $v^2$. Said loop-retainer is of the form shown in Figs. 5 and 7, and it is given a vibratory motion by a stud, 43, on the crank-collar $t$, which strikes the upper end of said retainer when said collar rotates, and causes the lower hooked end of the retainer to swing back, as shown in Fig. 13, catching the loop 45 and holding it sufficiently tight to keep it in engagement with the needle until the latter goes down through the fabric, when the loop pulls off from the retainer, the flexibility of the latter permitting such action, and immediately the spring 42 swings the retainer back to the position shown in Fig. 5.

Figure 1:
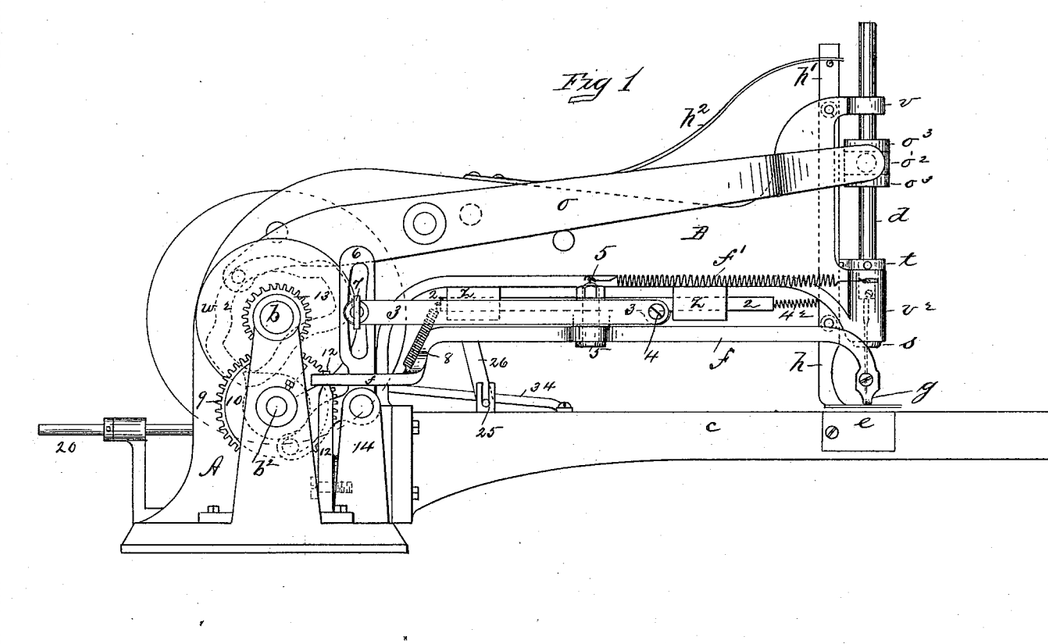
Figure 1 is a side elevation of a sewing-machine embodying our improvements.
Figure 17:
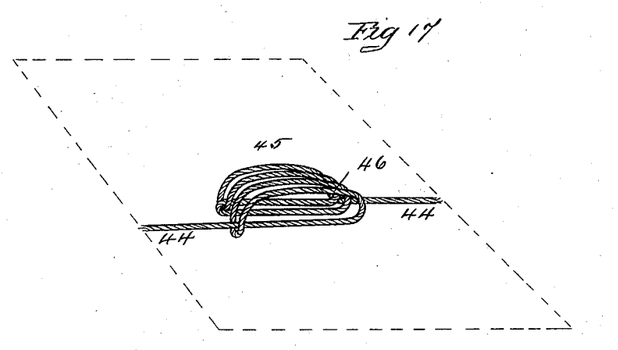
Fig. 17 is an enlarged perspective view of the completed stitch, the fabric being represented by dotted lines.

The operation of the above-described machine in forming stitches through fabric is as follows: The position of the shuttle, from which it begins its movements when a stitch is to be formed, is forward of the needle. The thread 44 is drawn from the bobbin in the shuttle and through the usual tension devices on the latter, and then through the thread-hole in the aforesaid pivoted thread-guide $i^2$, and thence around the take-up hook K, and thence back under the cloth-plate $e$ and up through the slot in the latter, and the end thereof is caught under a suitable spring-catch on the outside of the horn, so that it will be held while the thread is drawn from the shuttle as the latter moves. The material or fabric is next placed on the cloth-plate $e$ under the presser-foot, and the machine being set in motion the shuttle moves rearward, and at the same time the needle, whose open side is toward the shuttle, but turned a little to the rearward, goes down through the fabric far enough to catch the thread in its eye. When the needle is in said position, the end of the pivoted thread-guide $i^2$ on the shuttle, through which the thread passes, is just back of the needle, opposite the depression 52 (see Fig. 14) in the side of the shuttle-race, and the rear end of said thread-guide is opposite the pivoted finger 31 on slide 32, and by the movement of the latter said finger is made to swing against said rear end of the thread-guide and cause its opposite end to swing into said depression 52 a little to one side and back of the needle, causing the thread to be thereby drawn against the side of the latter, and thus insure its engagement by its open-sided eye. The shuttle being in the above-mentioned position and the needle down far enough to engage the thread, the needle then rises to its highest position, drawing up the loop. During said upward movement of the needle the take-up hook K, around which the thread was engaged, as aforesaid, moves toward the needle, giving off sufficient thread for the loop without drawing any more from the shuttle, and when the hook K arrives opposite the inclined end of guide 28 on the horn it swings back and lets go of the thread, and said finger 31 moves rearward and away from the side of the shuttle. As said take-up hook moves toward the needle, as aforesaid, the flexible loop-retainer $n$ swings under the point of the needle, catching the loop (see Fig. 13) and keeping sufficient tension on the latter to prevent its disengagement from the needle until the latter again goes down through the material; but before going down to give the needle said movement, the needle-bar $d$ rotates, as hereinbefore described, (simultaneously with said action of the loop-retainer $n$,) carrying the point of the needle to a new position over the fabric, in line with that through which said loop is drawn up and removed from it the distance of the length of the stitch. In Fig. 6 is illustrated, substantially, the said two positions of the needle over the fabric—that of the needle in full lines representing the first, and that in dotted lines the second, when the needle has swung to the opposite side of the feed-tongue $g$, carrying the thread across it. When the needle-bar turns, as aforesaid, the open side of the eye of the needle is brought toward the end of the horn $c$, and leaving the thread free to be drawn away from the needle by the shuttle when it next moves forward. The needle then goes down through the fabric, entering the groove $a$ in the side of the shuttle-race, pulling the loop off from the flexible retainer $n$, (said loop containing thread enough to allow the shuttle to pass through it,) and at its lowest point, the needle standing opposite the edge of the hook $m$, has the usual "dip movement" to open the loop for the shuttle, and the latter now moves forward, entering the loop and carrying the latter away from the needle, (see Fig. 14,) one side or thread of said loop from the under side of the material leading around outside of the shuttle, and the other running up between the shuttle and the adjoining side of the raceway and engaging with the loop-hook $m$ in the side of the latter, whereby the loop is held while the shuttle is passing through it, the thread in this instance not being held by the needle, as is usual in shuttle sewing-machines, while the shuttle passes through the loop. During the completion of the forward movement of the shuttle, and after it has passed through said loop, the take-up hook K engages with the latter, clearing the thread from the hook $m$, and moves forward, drawing out the loop-thread to about the position shown at 51, Fig. 16, and drawing the portion of the stitch shown in said figure closely against the fabric. The said portion of the stitch is but indifferently secured to the fabric, for if the thread under the fabric, which passes through the first loop, 45, be cut, the latter is easily pulled out, and therefore the completed stitch is formed of several of such parts of a stitch, as is shown in Fig. 16, worked one after the other, as described, into that shown in Fig. 17, through the same holes in the fabric substantially. In practice a stitch made as above described, having four threads passing over the top of the fabric or through the eye or shank of a button to attach the latter to fabric, is of sufficient strength to resist any ordinary strain upon the button, and if the thread between each of such stitches on the under side of the fabric be cut, no strain to which the button or the fabric may be subjected is sufficient to cause the threads of the stitch to slip in the latter and free the button. The said stitch is formed over or across the above-described feed-tongue g, and the end of the rod 3, Fig. 1, is adjusted to such a position on the slotted lever 6 as will determine the feed-movement of the material by the endwise motion thereby given to the feed-arm f, thereby spacing the stitches as described.

What we claim as our invention is—

1. In a sewing-machine, a needle-bar, a needle having a side opening in the eye thereof and secured in said bar to one side of the axis of the latter, a shuttle-race having a groove in the side thereof in the path of said needle, a loop-hook, substantially as described, located at the side of said groove, a shuttle having a motion to and fro in said race, and means, substantially as described, for imparting reciprocating vertical and rotary motions to said needle-bar, combined and operating substantially as set forth.

2. In a sewing-machine, a needle-bar, a needle having a side opening in the eye thereof and secured in said bar to one side of the axis of the latter, a shuttle having a to-and-fro motion beneath the needle, a flexible loop-retainer, substantially as described, pivoted by the side of the needle-bar, and having a lower hooked end extending by the side of said needle, and means, substantially as described, for imparting reciprocating vertical and rotary motions to said needle-bar, and vibratory motions to said loop-retainer, combined and operating substantially as set forth.

3. The needle-bar, the needle having a side opening in the eye thereof and secured in said bar, a shuttle-race having a groove in the side thereof in the path of said needle, and having a depression in said side near said groove, combined with the shuttle having the pivoted thread-guide $i^2$ on its side, and means, substantially as described, for swinging the thread-bearing end of said guide into said depression when the needle is in said groove, substantially as set forth.

4. The needle-bar, the needle having a side opening in the eye thereof and secured in said bar to one side of the axis of the latter, a shuttle having a to-and-fro motion beneath the needle, a take-up hook pivoted to vibrate in a horizontal plane, and having a reciprocating movement toward and from the eye side of the needle, and means, substantially as described, for imparting vertical and rotary reciprocating motions to said needle-bar, and for imparting a vibratory motion to said take-up hook, combined and operating substantially as set forth.

5. The feed-tongue extending in a horizontal plane above the cloth-plate and attached to the end of a feed-arm, the needle-bar, the needle having a side opening in the eye thereof and secured in said bar to one side of the axis of the latter, a shuttle and take-up mechanism, and operating devices, substantially as described, and means, substantially as described, for imparting reciprocating vertical and rotary motions to said needle-bar, and longitudinally reciprocating and vibratory motions to said feed-arm, combined and operating substantially as set forth.

6. In combination, the feed-tongue extending in a horizontal plane above the cloth-plate and attached to a feed-arm, the needle-bar having reciprocating vertical and rotary motions, and a needle secured in said bar to one side of the axis of the latter and capable, by means substantially as described, of puncturing the fabric each side of said tongue and carrying the stitch-thread across the latter, substantially as set forth.

7. The needle-bar, the needle secured in the latter to one side of its axis, said bar having a longitudinal spline-groove therein, a sleeve in which the needle-bar has a bearing interposed between one of the bearings of the latter in the arm of the machine and said bar, a feather-key attached to said sleeve and engaging in said spline-groove, a crank-collar secured to said sleeve, a connecting-rod having a pivotal attachment with said crank-collar, and means, substantially as described, for imparting an endwise reciprocating motion to said connecting-rod, combined and operating substantially as set forth.

8. The needle-bar, the needle secured in the latter to one side of its axis, said bar having a longitudinal spline-groove therein, a sleeve in which the needle-bar has a bearing interposed between one of the bearings of the latter in the arm of the machine and said bar, a feather-key attached to said sleeve and engaging in said spline-groove, a crank-collar secured to said sleeve and having a stud thereunder, a connecting-rod having a pivotal connection with said crank-collar, the flexible loop-retainer pivoted at the side of the needle-bar, having one end extending toward said collar and engaging with said stud thereon, and its opposite end extending downward by the side of the needle, a retracting-spring drawing the upper end of the loop-retainer against said stud, and means, substantially as described, for imparting an endwise reciprocating motion to said connecting-rod, combined and operating substantially as set forth.

9. In combination, the feed-tongue, the feed-arm f, the slide-bar 2, having said arm pivoted thereto, the connecting-rod 3, attached to said slide, the spring 8, interposed between the latter and said arm, the elbow-lever 6, having a slot therein with which the end of rod 3 is adjustably connected, the pivoted lever 12, interposed between the rear end of said arm and the cam, which gives vibratory motions to the latter, and suitable cams for giving vibratory motions to said levers 6 and 12, substantially as set forth.

10. In combination, the shuttle having the pivoted thread-guide $i^2$ thereon, the slide 32, operating in a groove in the horn c, the finger 31, pivoted on said slide, the cam-guide 33 on the horn, extending over said groove therein, and means, substantially as described, for imparting reciprocating endwise motions to said slide, substantially as set forth.

11. The needle having an opening in the side of the eye, the needle-bar, and mechanism for rocking the same on its axis, the shuttle race having the needle-groove A in one side thereof, the loop-hook $m$, fixed in the side of the race near said groove, and a shuttle having a to-and-fro motion in the race, all combined as stated.

12. The take-up devices consisting of the slide 24, operating in a groove in the horn, the take-up hook K, pivoted on said slide, the plate 30, also attached to said slide, and having an arm extending opposite said hook, the spring 29, the cam-plate 28, secured on the horn opposite said hook, and means, substantially as described, for imparting reciprocating endwise motions to said slide, combined and operating substantially as set forth.

HENRY H. CUMMINGS.
WALTER E. BENNETT.
ROSEWELL THOMPSON.

Witnesses:
WM. A. KNOWLTON,
E. H. CRANDELL.